(12) United States Patent
Sabe et al.

(10) Patent No.: US 10,346,855 B2
(45) Date of Patent: Jul. 9, 2019

(54) REDUCING ELECTRIC ENERGY CONSUMPTION BASED ON ENERGY USAGE PATTERN

(75) Inventors: Kohtaro Sabe, Tokyo (JP); Takashi Iwama, Tokyo (JP); Hiroshi Kamitani, Tokyo (JP); Osamu Shimizu, Kanagawa (JP); Masashi Takiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 700 days.

(21) Appl. No.: 13/538,286

(22) Filed: Jun. 29, 2012

(65) Prior Publication Data

US 2013/0018717 A1  Jan. 17, 2013

(30) Foreign Application Priority Data

Jul. 15, 2011 (JP) ................................ 2011-156247

(51) Int. Cl.
G06Q 30/00 (2012.01)
G06Q 30/02 (2012.01)
G06F 1/26 (2006.01)

(52) U.S. Cl.
CPC .............. *G06Q 30/02* (2013.01); *G06F 1/26* (2013.01)

(58) Field of Classification Search
CPC .............................. G06Q 30/0207; G06F 1/26
USPC ............................................. 702/62; 705/14
See application file for complete search history.

(56) References Cited

U.S. PATENT DOCUMENTS

| 4,401,943 | A | * | 8/1983 | Morris | G01R 15/08 235/85 R |
| 4,644,320 | A | * | 2/1987 | Carr | H02J 13/0006 340/12.37 |
| 5,650,771 | A | * | 7/1997 | Lee | G01R 15/12 340/538.17 |
| 6,226,600 | B1 | * | 5/2001 | Rodenberg, III | G01R 22/00 340/12.32 |
| 9,194,719 | B2 | * | 11/2015 | Kashiwagi | G01D 4/00 |
| 2002/0143693 | A1 | * | 10/2002 | Soestbergen et al. | 705/37 |
| 2002/0198629 | A1 | * | 12/2002 | Ellis | G06Q 50/06 700/286 |

(Continued)

FOREIGN PATENT DOCUMENTS

JP 2009-048536 A 3/2009

*Primary Examiner* — Matthew L Hamilton
(74) *Attorney, Agent, or Firm* — Chip Law Group

(57) ABSTRACT

An information processing apparatus includes an electric power related information obtaining unit mounted on or connected to equipment and configured to obtain electric power related information with regard to the equipment and a communication unit configured to transmit the electric power related information obtained by the electric power related information obtaining unit to a rebate processing apparatus connected via a network. A rebate processing apparatus includes a communication unit configured to receive electric power related information transmitted from an information processing apparatus mounted on or connected to equipment via the network, a rebate reference calculation unit configured to calculate a rebate reference functioning as a reference for a rebate processing on the basis of the electric power related information, and a rebate processing unit configured to perform a predetermined rebate processing on the basis of the rebate reference.

8 Claims, 13 Drawing Sheets

| EQUIPMENT CLASSIFICATION | TYPE | ELECTRIC POWER CONSUMPTION [STANDBY ENERGY] |
|---|---|---|
| LIQUID CRYSTAL TELEVISION | TV-55HX920 | 183w [0.2w] |
| LIQUID CRYSTAL TELEVISION | TV-42HX800 | 130w [0.2w] |
| LIQUID CRYSTAL TELEVISION | TV-32HX500 | 100w [0.1w] |
| PERSONAL COMPUTER | VPC229F | 29w [1.9w] |
| PERSONAL COMPUTER | VPC119D | 2w [1.0w] |
| DIGITAL CAMERA | WX7 | 1.1w |
| DIGITAL CAMERA | WX5 | 1.0w |

(56) References Cited

U.S. PATENT DOCUMENTS

| | | | |
|---|---|---|---|
| 2006/0015379 A1* | 1/2006 | Cogar | G06Q 50/06 705/28 |
| 2006/0031180 A1* | 2/2006 | Tamarkin | G01D 4/004 705/412 |
| 2006/0031692 A1* | 2/2006 | Kato | G06F 1/3203 713/300 |
| 2009/0195349 A1* | 8/2009 | Frader-Thompson | G01D 4/002 340/3.1 |
| 2010/0076835 A1* | 3/2010 | Silverman | G06Q 10/06 705/14.33 |
| 2010/0145885 A1* | 6/2010 | Graziano | B60L 11/1816 705/412 |
| 2010/0211509 A1* | 8/2010 | Jacobs | G01R 21/133 705/302 |
| 2010/0235008 A1* | 9/2010 | Forbes et al. | 700/291 |
| 2010/0235144 A1* | 9/2010 | Mosberger-Tang | G01D 4/004 702/188 |
| 2010/0250440 A1* | 9/2010 | Wang | G06Q 10/06 705/63 |
| 2010/0293045 A1* | 11/2010 | Burns | G06Q 30/0208 705/14.11 |
| 2010/0333155 A1* | 12/2010 | Royall | H04N 5/23203 725/105 |
| 2011/0023045 A1* | 1/2011 | Yates | G06Q 10/063114 718/104 |
| 2011/0098953 A1* | 4/2011 | Jonsson | 702/62 |
| 2011/0153111 A1* | 6/2011 | Doh | H02J 9/005 700/296 |
| 2012/0098518 A1* | 4/2012 | Unagami | G01R 22/066 324/74 |
| 2012/0226592 A1* | 9/2012 | Flynn | G06Q 50/06 705/34 |
| 2014/0121849 A1* | 5/2014 | Ansari | H02J 13/0013 700/295 |
| 2015/0015232 A1* | 1/2015 | Voisine | G01R 11/02 324/74 |
| 2016/0274609 A1* | 9/2016 | Siddall | G05B 15/02 |
| 2017/0010661 A1* | 1/2017 | Yang | G06F 1/3209 |

* cited by examiner

FIG. 3

| EQUIPMENT CLASSIFICATION | TYPE | ELECTRIC POWER CONSUMPTION [STANDBY ENERGY] |
|---|---|---|
| LIQUID CRYSTAL TELEVISION | TV-55HX920 | 183w [0.2w] |
| LIQUID CRYSTAL TELEVISION | TV-42HX800 | 130w [0.2w] |
| LIQUID CRYSTAL TELEVISION | TV-32HX500 | 100w [0.1w] |
| PERSONAL COMPUTER | VPC229F | 29w [1.9w] |
| PERSONAL COMPUTER | VPC119D | 2w [1.0w] |
| DIGITAL CAMERA | WX7 | 1.1w |
| DIGITAL CAMERA | WX5 | 1.0w |

FIG. 4

| USER NAME | ADDRESS | TELEPHONE NUMBER | ACCOUNT INFORMATION | USER ID | EQUIPMENT IDENTIFICATION INFORMATION |
|---|---|---|---|---|---|
| ICHIRO SUZUKI | ... SHINAGAWA-KU, TOKYO | 03-**** | ** BANK 2958475 | ichiro | SUGPE4938G |
| MASAMI TANAKA | ... KAWAGOE-SHI, SAITAMA | 03-**** | ○○ BANK 139496 | tanamasa | SU93U49AQ |
| | | | | | CPEP48GGD |
| | | | | | g6987UGG |
| KIYOKO YAMADA | ... NERIMA-KU, TOKYO | 03-**** | ×× BANK 0979544 | uniuni | GDU09493WW |
| | | | | | KG306KDG |

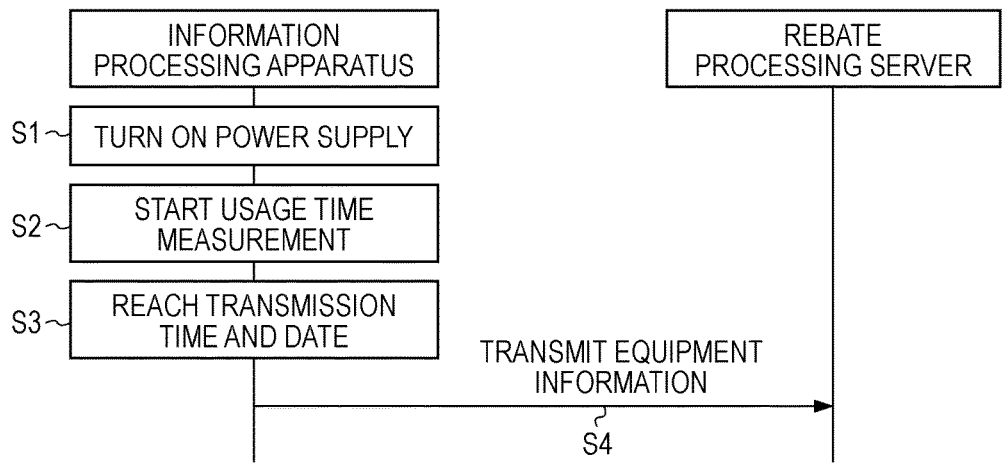
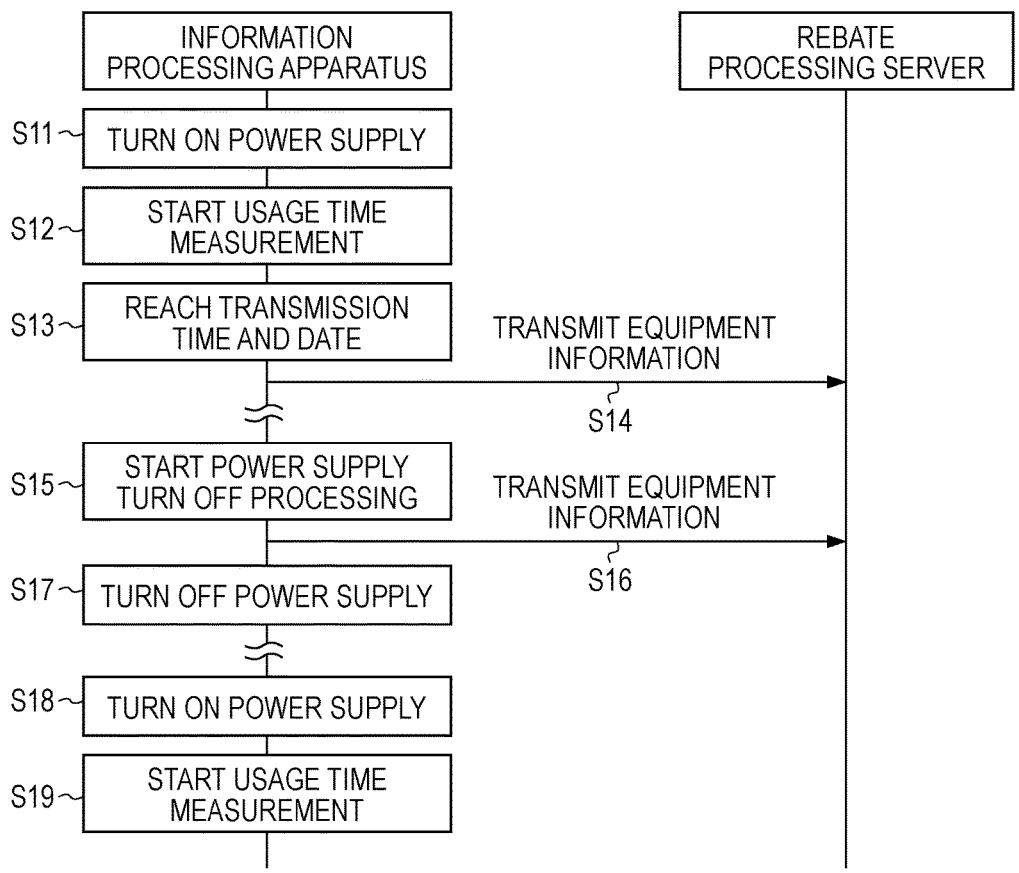

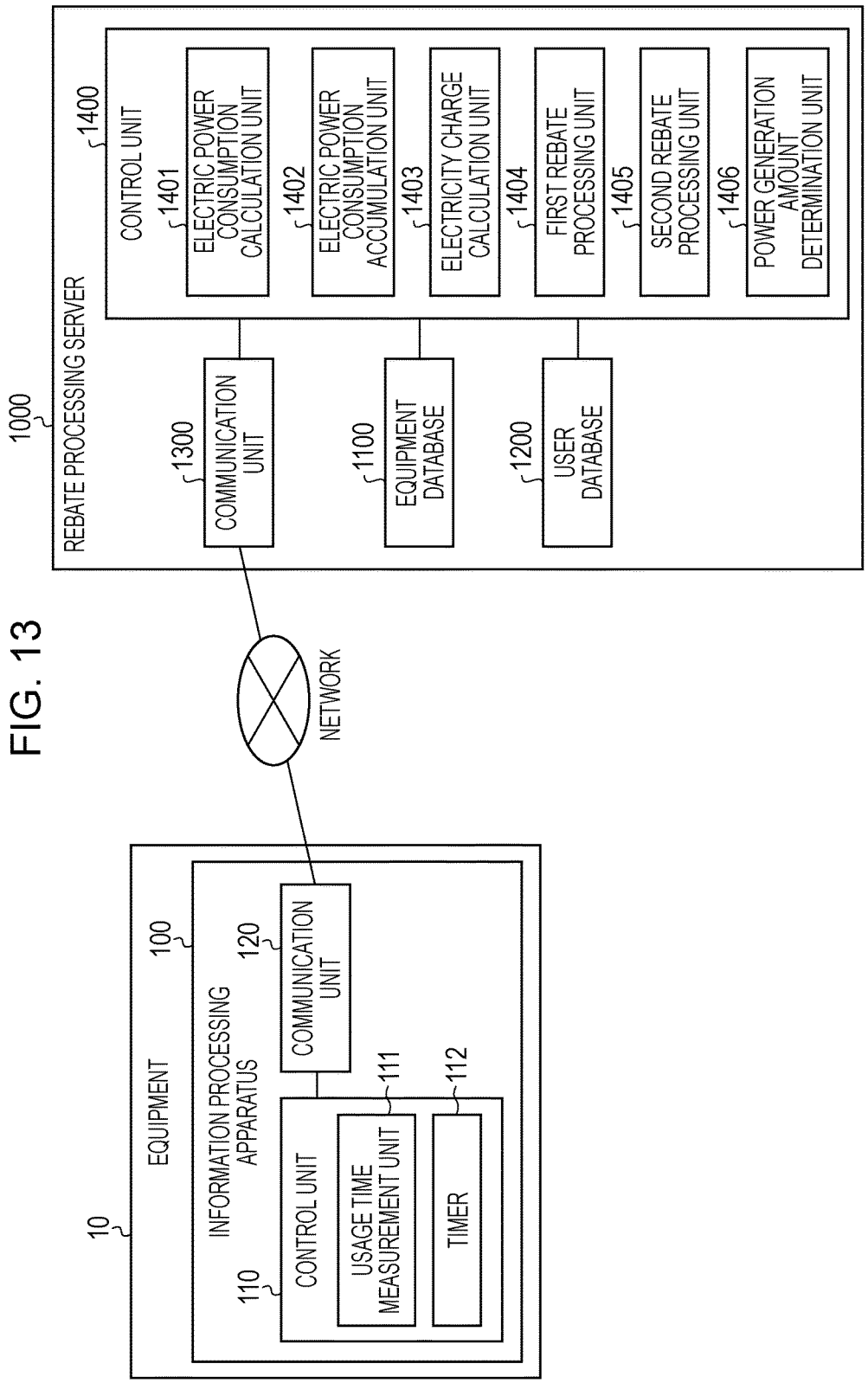

REDUCING ELECTRIC ENERGY CONSUMPTION BASED ON ENERGY USAGE PATTERN

BACKGROUND

The present technology relates to an information processing apparatus, a rebate processing apparatus, an information processing method, a rebate processing method, and a rebate processing system. The present technology more specifically relates to an information processing apparatus, a rebate processing apparatus, an information processing method, a rebate processing method, and a rebate processing system with which various benefits are rebated in accordance with electric power consumption.

Environmental problems such as global warming and depletion of resources and energy are challenges shared by all of mankind. For reduction of an amount of carbon dioxide that is said to be a cause of a warmer climate, more countries and local authorities impose a certain duty for reducing the amount of carbon dioxide emission in business activities by way of regulations or the like. In business enterprises, for example, the following measures and policies are expected to be implemented in which power saving of a large scale facility such as a factory is advanced, and also electric power consumption in its own company is covered by power generation based on renewable energy from which carbon dioxide is not emitted in power generation processes to promote the reduction of carbon dioxide amount.

In this manner, regarding the energy consumption in an industrial sector, the reduction of carbon dioxide amount is gradually progressed through obligations by way of laws. On the other hand, it is difficult to make it obligatory by way of laws to reduce the energy consumption in a household sector which accounts for approximately one third of the whole energy consumption. Therefore, some measures are demanded to promote the efficient energy usage.

In view of the above, a collection method for fuel bills of fuel cells and an imposition method for upkeep costs of the fuel cells are proposed which are related to the collection of a charge for fuels and a refund of a payment for the electric power sold to an electric supply company in a case where the fuel cells are installed for a customer and a part of the electric power generated by the fuel cells is sold to the electric supply company (Japanese Unexamined Patent Application Publication No. 2009-48536).

SUMMARY

However, the technology disclosed in Japanese Unexamined Patent Application Publication No. 2009-48536 is a scheme for paying back a difference of charges based on payment information on public utility charges to an electric power company and is not a scheme for calculating electricity charges for arbitrary electric goods for paying back like the present technology or a scheme for making the charges free. Also, the technology disclosed in Japanese Unexamined Patent Application Publication No. 2009-48536 does not include a proposal for the environmental load reduction.

Therefore, according to the present technology, it is desirable to provide an information processing apparatus, a rebate processing apparatus, an information processing method, a rebate processing method, and a rebate processing system with which various benefits can be rebated to a user who uses electric power.

In view of the above-mentioned circumstances, an information processing apparatus according to an embodiment of the present technology includes: an electric power related information obtaining unit mounted on or connected to equipment and configured to obtain electric power related information with regard to the equipment; and a communication unit configured to transmit the electric power related information obtained by the electric power related information obtaining unit to a rebate processing apparatus connected via a network.

A rebate processing apparatus according to another embodiment of the present technology includes: a communication unit configured to receive electric power related information transmitted from an information processing apparatus mounted on or connected to equipment via the network; a rebate reference calculation unit configured to calculate a rebate reference functioning as a reference for a rebate processing on the basis of the electric power related information; and a rebate processing unit configured to perform a predetermined rebate processing on the basis of the rebate reference.

An information processing method according to another embodiment of the present technology includes: obtaining electric power related information related to equipment; and transmitting the electric power related information to a rebate processing apparatus connected via a network.

A rebate processing method according to another embodiment of the present technology includes: receiving electric power related information transmitted from an information processing apparatus mounted on or connected to equipment via a network; calculating a rebate reference functioning as a reference for a rebate processing on the basis of the electric power related information; and performing a predetermined rebate processing on the basis of the rebate reference.

In addition, a rebate system according to another embodiment of the present technology includes: an information processing apparatus including an electric power related information obtaining unit mounted on or connected to equipment and configured to obtain electric power related information with regard to the equipment and a first communication unit configured to transmit the electric power related information obtained by the electric power related information obtaining unit to a rebate processing apparatus connected via a network; and a rebate processing apparatus including a second communication unit configured to receive the electric power related information transmitted from the information processing apparatus, a rebate reference calculation unit configured to calculate a rebate reference functioning as a reference for a rebate processing on the basis of the electric power related information, and a rebate processing unit configured to perform a predetermined rebate processing on the basis of the rebate reference.

According to the present technology, various benefits can be rebated to a user consuming electric power through the usage of the equipment in accordance with the electric power consumption by the user.

BRIEF DESCRIPTION OF THE DRAWINGS

FIG. 3 illustrates examples of information stored in equipment database;

FIG. 4 illustrates examples of user information stored in user database;

FIGS. 5A and 5B are sequence diagrams illustrating a flow of a transmission processing for information from the information processing apparatus to the rebate processing server;

FIG. 13 is a block diagram of configurations of the information processing apparatus and the rebate processing server according to the modified example of the present technology.

DETAILED DESCRIPTION OF EMBODIMENTS

Figure 1:
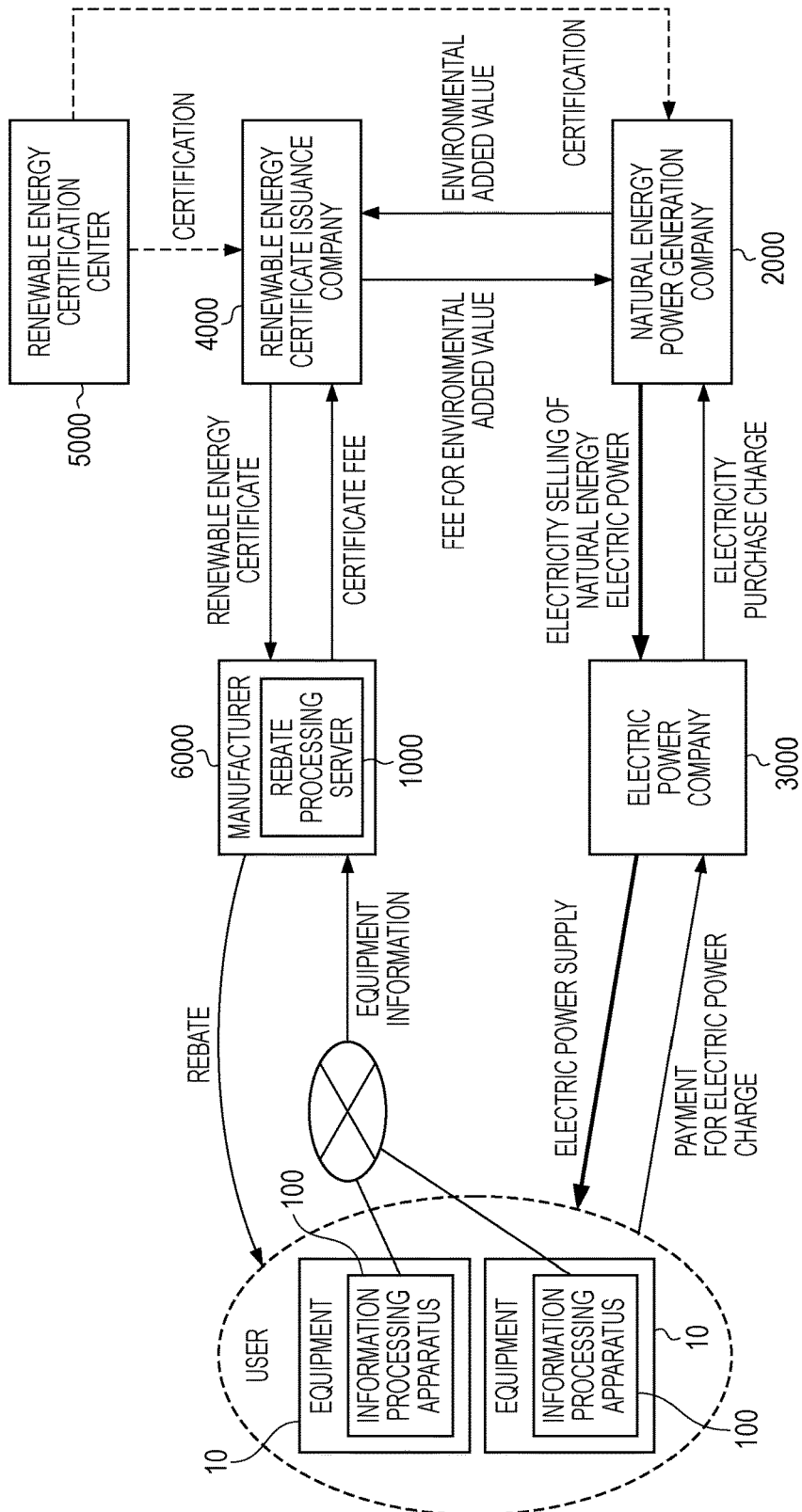
FIG. 1 illustrates an entire configuration of a rebate system.

Hereinafter, embodiments of the present technology will be described with reference to the drawings. It is however noted that the present technology is not limited to the following embodiments. The description will be given in the following order.
1. First Embodiment
1-1. Configuration of rebate system
1-2. Configuration of information processing apparatus
1-3. Configuration of rebate processing server
1-4. Processing in information processing apparatus
1-5. Processing in rebate processing server
2. Second Embodiment
3. Third Embodiment
4. Fourth Embodiment
5. Modified Examples 1. First Embodiment 1-1. Configuration of Rebate System FIG. 1 is a block diagram illustrating a scheme for utilizing a rebate system according to the present technology. The rebate system includes an information processing apparatus 100 and a rebate processing server 1000. The information processing apparatus 100 is mounted on or connected to equipment 10 owned by a user. The user may own a plurality of the equipment 10 each have the information processing apparatus 100 mounted on or connected thereto. The number of the users may also be plural. The rebate processing server 1000 is used under a management of a manufacturer 6000 that is an actual producer of the equipment 10 used by the user. The rebate processing server 1000 is equivalent of a rebate processing apparatus in the scope of claims.

According to the present embodiment, to utilize the rebate system, in addition to the information processing apparatus 100 and the rebate processing server 1000, a company that performs power generation based on natural energy (hereinafter, which will be referred to as natural energy power generation company 2000), an electric power company 3000, a company that issues a renewable energy certificate (hereinafter, which will be referred to as renewable energy certificate issuance company 4000), a renewable energy certification center 5000, and the manufacturer 6000 are provided.

The natural energy power generation company 2000 is an enterprise provided with a power generation facility using so-called natural energy (renewable energy) such as solar photovoltaic power, solar thermal power, wind power, hydraulic power, small hydraulic power, tidal power, wave power, gradient power, marine currents power, biomass power, and geothermal heat power to carry out the natural energy power generation. The power generation method using the natural energy, however, is not limited to the above and may be any power generation method including a power generation method expected to be newly developed in future so long as the environment load is low. In addition, an entity that performs the power generation based on the natural energy is not limited to the enterprise and may also be an individual.

Among the electric power obtained through the power generation using the natural energy by the natural energy power generation company 2000, a part corresponding to a "value as electric power itself" is mainly used for an electric power selling to the electric power company 3000 or a captive consumption within the natural energy power generation company 2000.

The electric power company 3000 is a company dealing with a so-called electric industry as a main profit-making source where an electric power supply is provided. The power generation method used by the electric power company 3000 includes, in addition to the natural energy power generation, a power generation method such as thermal power generation or atomic power generation where the environment load is larger as compared with the natural energy power generation. The electric power company 3000 also provides an electric power supply to users. In addition, the electric power company 3000 also purchases the electric power obtained by the natural energy power generation company 2000 through the natural energy power generation.

The renewable energy certificate issuance company 4000 issues a renewable energy certificate. The renewable energy certificate is a certificate based on an idea that the electric power obtained by the above-mentioned natural energy has the "value as electric power itself" and also a "value as being the power generation from which carbon dioxide is not emitted", that is, an environmental added value, and the environmental added value is made tradable.

When the renewable energy certificate is purchased, the purchaser of the renewable energy certificate is regarded as being contributed to the environment load reduction by using the relevant electric power. Therefore, for example, when an enterprise purchases the renewable energy certificate, the enterprise regarded to achieve the reduction obligation for the environment load imposed by the regulations or the like. Then, the purchase fee for the renewable energy certificate is provided to the natural energy power generation company 2000. A system utilizing the above-mentioned renewable energy certificate is referred to as renewable energy certificate system. With this renewable energy certificate system, it is possible to promote the spread and expansion of the natural energy power generation. It is noted that the renewable energy certificate can be purchased by not only the enterprises but also the individuals.

The renewable energy certificate issuance company 4000 takes over the environmental added value part among the electric power obtained through the power generation using the natural energy by the natural energy power generation company 2000 and puts the environmental added value in the certificate.

The renewable energy certification center 5000 is an institution that carries out a certification related to the renewable energy certificate, a standard establishment, a promotion activity, and the like. The renewable energy certification center 5000 certifies whether or not the natural energy power generation company 2000 conducts the power generation using the natural energy. In addition, the renewable energy certification center 5000 checks whether or not the environmental added value which is tradable by being taken over by the renewable energy certificate issuance company 4000 is generated by a certified natural energy power generation facility 2100.

The manufacturer 6000 performs production and distribution of various electric equipment, electronic equipment, and the like to be used by the users. The equipment 10 may be any equipment so long as the equipment is operated by electric power. The equipment 10 includes, for example, a television receiver, a personal computer, a printer, a photo frame, a digital camera, a refrigerator, an air conditioner, a washing machine, a vacuum cleaner, a game machine, an audio amplifier, an electric automobile, a hybrid car, and the like. In addition, an enterprise of any scale or the like may be the manufacturer 6000 so long as the enterprise performs the production and distribution of the equipment 10 and the like operated by electric power.

1-2. Configuration of Information Processing Apparatus

Figure 2:
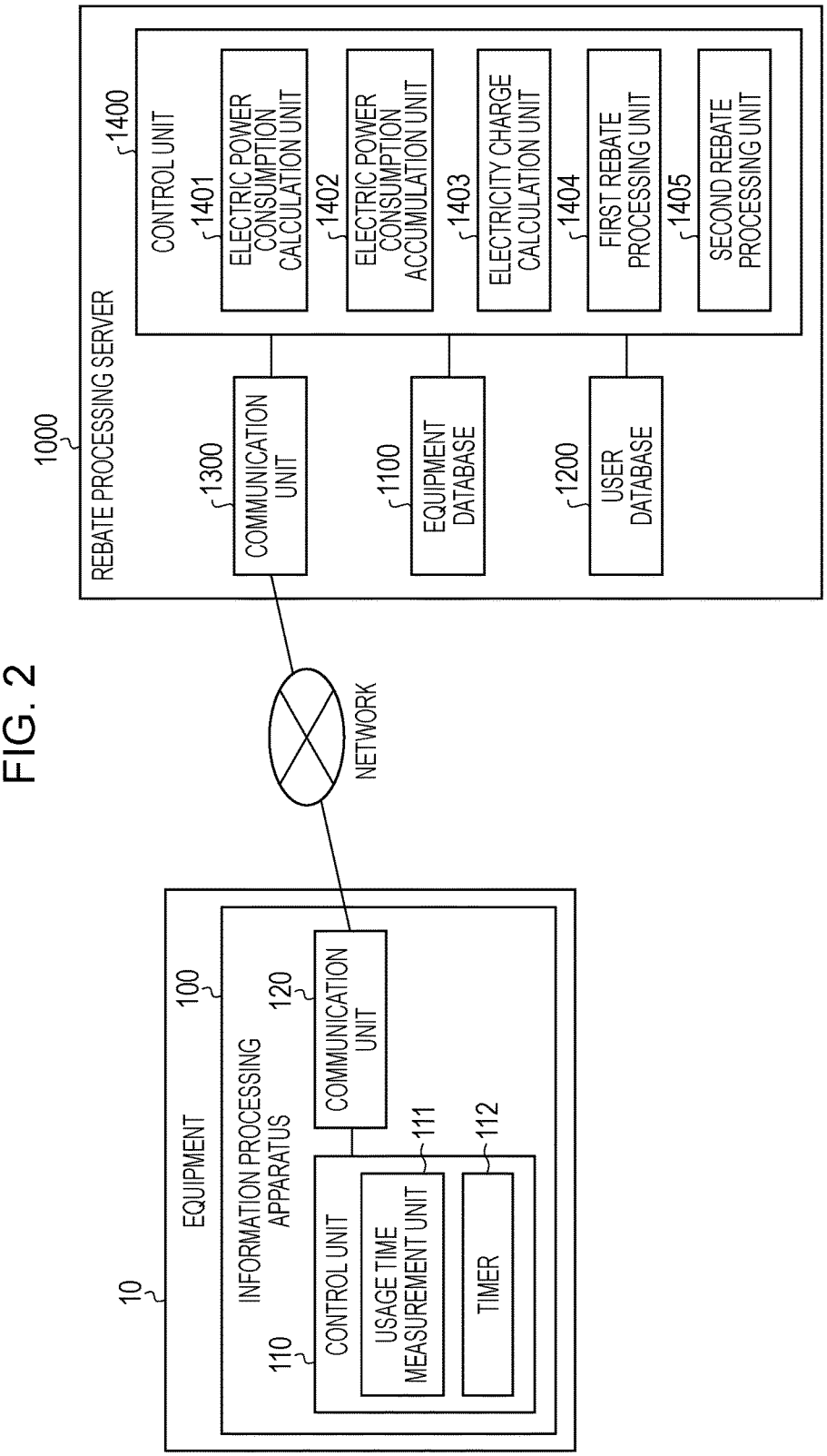
FIG. 2 is a block diagram of configurations of an information processing apparatus and a rebate processing server according to a first embodiment of the present technology.

A configuration of the information processing apparatus 100 will be described with reference to FIG. 2. FIG. 2 is a block diagram of configurations of the information processing apparatus 100 and the rebate processing server 1000. The information processing apparatus 100 is used while being mounted on or connected to the equipment 10. The information processing apparatus 100 may not be previously mounted to the equipment 10 and may also be configured as dedicated-use hardware that can be externally connected to the equipment 10. In addition, a single information processing apparatus may correspond to a single equipment, and also processings in plural equipment may be executed by the single information processing apparatus. The information processing apparatus 100 includes a control unit 110, a usage time measurement unit 111, a timer 112, and a communication unit 120.

The control unit 110 includes a central processing unit (CPU), a random access memory (RAM), a read only memory (ROM), and the like. The ROM stores a program to be read by the CPU. The RAM is used as a work memory for the CPU. The CPU controls the entirety of the information processing apparatus 100 by executing various processings on the basis of the program stored in the ROM. In addition, the control unit 110 also functions as the usage time measurement unit 111 and the timer 112 by executing a given program.

The usage time measurement unit 111 detects on or off of a power supply of the equipment 10 to which the information processing apparatus 100 is mounted or connected and measures a period of time from a time when the power supply of the equipment 10 is turned on to a time when the power supply is turned off, that is, a period of time during which the equipment 10 is used (hereinafter, which will be referred to as equipment usage time). Equipment usage time information indicating this equipment usage time is equivalent of electric power related information in the scope of claims. The usage time measurement unit 111 is also equivalent of an electric power related information obtaining unit in the scope of claims.

The determination as to whether the power supply of the equipment 10 is on or off can be conducted, for example, by detecting a voltage change in an electric power supply line for supplying the electric power to the respective units constituting the equipment 10 within the equipment 10. In addition, in a case where the equipment 10 is provided with a physical power supply switch, the determination as to whether the power supply is on or off can also be conducted by detecting whether or not the power supply switch is pressed.

The equipment usage time information is transmitted to the rebate processing server 1000 together with equipment type information for indicating a type of the equipment 10 and equipment identification information for identifying the equipment 10. The type is generally formed of a character string of plural characters, and all equipment have a common type so long as the equipment are produced in the same classification of the same manufacturer.

In addition, the equipment identification information refers to information for individually identifying the equipment 10, and the equipment identification information varies in all the equipment even when the equipment are of the same classification produced by the same manufacturer. In general, the equipment type information and the equipment identification information are recorded on the ROM or the like of a control unit (not illustrated) of the equipment 10. The information processing apparatus 100 reads out and obtains the equipment type information and the equipment identification information from the ROM or the like of the equipment. Once the information processing apparatus 100 obtains the equipment type information and the equipment identification information of the equipment 10, the equipment type information and the equipment identification information described above may be stored in its own storage medium. It is noted that in the following description, the equipment usage time information, the equipment type information, and the equipment identification information are collectively referred to as equipment information.

The timer 112 is configured to determine whether or not the current time and date reach previously set time and date at which the transmission of the equipment identification is carried out. The transmission of the equipment identification is carried out at regular intervals, for example, once a day or once a month. Therefore, with regard to the time and date at which the transmission of the equipment identification is carried out, in a case where the transmission of the equipment identification is carried out once a day, for example, a time such as "at 0 o'clock every day" is set. In a case where the transmission of the equipment identification carried out once a month, a date and a time such as "at 0 o'clock on 25th day of every month" are set. A frequency and the time and date at which the transmission of the equipment identification is carried out may be previously determined on the manufacturer 6000 side or determined through a contract between the user and the manufacturer 6000.

The communication unit 120 is a network interface for conducting a communication with the rebate processing server 1000 via a network such as the internet on the basis of a predetermined protocol under the control of the control unit 110. A communication system may be any communication system such as a wired communication, a wireless local area network (LAN), wireless fidelity (Wi-Fi), and a communication using a 3G network.

The equipment usage time information indicating the equipment usage time measured by the usage time measurement unit 111 is transmitted to the rebate processing server 1000 when the current time and date reach the point at which the transmission of the equipment identification is carried out together with the equipment type information and the equipment identification information under the control of the control unit 110 by the communication unit 120. A detail of the transmission processing for the equipment identification carried out by the information processing apparatus 100 will be described below.

1-3. Configuration of Rebate Processing Server

A configuration of the rebate processing server 1000 will be described. The rebate processing server 1000 includes equipment database 1100, user database 1200, a communication unit 1300, a control unit 1400, an electric power consumption calculation unit 1401, an electric power consumption accumulation unit 1402, the electricity charge calculation unit 1403, a first rebate processing unit 1404, and a second rebate processing unit 1405. The rebate processing server 1000 is equivalent of a rebate processing apparatus in the scope of claims.

The equipment database 1100 stores electric power consumption information indicating types regarding all equipment produced and distributed by the manufacturer 6000 and electric power consumptions of the respective types. The equipment database 1100 stores, for example, as illustrated in FIG. 3, a classification of the equipment 10, a type, an electric power consumption and a standby energy of the type.

The user database 1200 stores information related to a user who purchases the equipment 10 produced and distributed by the manufacturer 6000 (user information). The user information includes a name of the user, an address, a telephone number, payment transfer information such as an account number of a banking institution, a user ID. As illustrated in FIG. 4, the user information is stored in the user database 1200 while being associated with the equipment identification information of the equipment 10 owned by the user. However, the user information is not limited to the above-mentioned examples. Any information may be used so long as an agreement on the obtainment of the information is achieved between the user and the manufacturer 6000 and the information is conceivable to be utilized in the rebate processing server 1000.

The user information can be obtained, for example, by carrying out a user registration processing in which when the user uses the equipment 10 for the first time, a request is made to be connected to the network and to transmit the user information to the manufacturer 6000 via the network.

The communication unit 1300 is a network interface for conducting a communication with the information processing apparatus 100 via a network such as the internet on the basis of a predetermined protocol under the control of the control unit 110. A communication system may be any communication system such as a wired communication, a wireless LAN, Wi-Fi, and a communication using a 3G network. The communication unit 1300 receives the equipment information transmitted from the information processing apparatus 100 and supplies the equipment information to the control unit 1400.

The control unit 1400 includes a CPU, a RAM, and a ROM. The ROM stores a program read by the CPU. The RAM is used as a work memory for the CPU. The CPU controls the entirety of the rebate processing server 1000 by executing various processings on the basis of the program stored in the ROM. In addition, the control unit 1400 also functions as the electric power consumption calculation unit 1401, the electric power consumption accumulation unit 1402, the electricity charge calculation unit 1403, the first rebate processing unit 1404, and the second rebate processing unit 1405 by executing a predetermined program.

The electric power consumption calculation unit 1401 calculates an electric power amount employed for using the equipment 10 (hereinafter, which will be referred to as electric power consumption) on the basis of the equipment usage time information transmitted from the information processing apparatus 100 at regular intervals.

The electric power consumption accumulation unit 1402 accumulates the electric power consumption calculated by the electric power consumption calculation unit 1401 for each user of the equipment 10 to calculate an accumulative electric power consumption for each user. The electric power consumption calculated by the electric power consumption calculation unit 1401 or the accumulative electric power consumption calculated by the electric power consumption accumulation unit 1402 is equivalent of a rebate reference in the scope of claims.

The electricity charge calculation unit 1403 calculates an electricity charge to be paid by the user to the electric power company 3000 for the usage of the equipment 10 on the basis of the accumulative electric power consumption calculated by the electric power consumption accumulation unit 1402. The electric power consumption calculation unit 1401, the electric power consumption accumulation unit 1402, and the electricity charge calculation unit 1403 are equivalent of a rebate reference calculation unit in the scope of claims.

The first rebate processing unit 1404 performs a predetermined rebate processing on the basis of the electricity charge calculated by the electricity charge calculation unit 1403. The second rebate processing unit 1405 performs a predetermined rebate processing on the basis of the accumulative electric power consumption. Therefore, the electricity charge and the accumulative electric power consumption are both equivalent of a rebate reference in the scope of claims. It is noted that details of the processings in the electric power consumption calculation unit 1401, the electric power consumption accumulation unit 1402, the electricity charge calculation unit 1403, the first rebate processing unit 1404, and the second rebate processing unit 1405 will be described below. The rebate processing server 1000 is thus configured in the above-mentioned manner.

1-4. Processing in Information Processing Apparatus

A processing in the rebate system will be described. First, the transmission of the equipment identification from the information processing apparatus 100 to the rebate processing server 1000 will be described. FIGS. 5A and 5B are sequence diagrams for describing a detail of the transmission processing for the equipment identification.

FIG. 5A is a sequence diagram illustrating a first mode of the transmission of the equipment identification from the information processing apparatus 100 to the rebate processing server 1000. First, in step S1, the power supply of the equipment 10 to which the information processing apparatus 100 is mounted or connected is turned on. When the power supply is turned on, in step S2, the usage time measurement unit 111 starts the measurement of the usage time of the equipment 10. Then, in step S3, the timer 112 determines that the current time and date reach notification time and date for the equipment information, and in step S4, under the control of the control unit 110, the communication unit 120 transmits the equipment information to the rebate processing server 1000. After that, continuously, the measurement of the usage time, the determination as to whether the transmission time and date reach, and the transmission of the equipment identification are repeatedly carried out.

It is conceivable that this first mode is used, for example, in equipment such as a refrigerator or a photo frame where a power supply is not turned off in general unless a fault such as a failure occurs after the power supply is turned on once.

FIG. 5B is a sequence diagram illustrating a second mode of the transmission of the equipment identification from the information processing apparatus 100 to the rebate processing server 1000. A processing in steps S11 to 14 is similar to the processing in steps S1 to 4 of the first mode, and a description thereof will be omitted.

As illustrated in step S15, when a processing of turning the power supply of the equipment 10 off is started by pressing a power supply button (not illustrated) of the equipment 10, for example, as illustrated in step S16, the equipment information is transmitted to the rebate processing server 1000. The transmission of the equipment identification in step S16 is conducted even in a case where the current time and date do not reach the determined transmission time and date, and the equipment information including the equipment usage time information valid until the power supply is turned off is transmitted.

After that, when the power supply of the equipment 10 is turned on as illustrated in step S18, the measurement for the equipment usage time is started in step S19.

1-5. Processing in Rebate Processing Server

Figure 6:
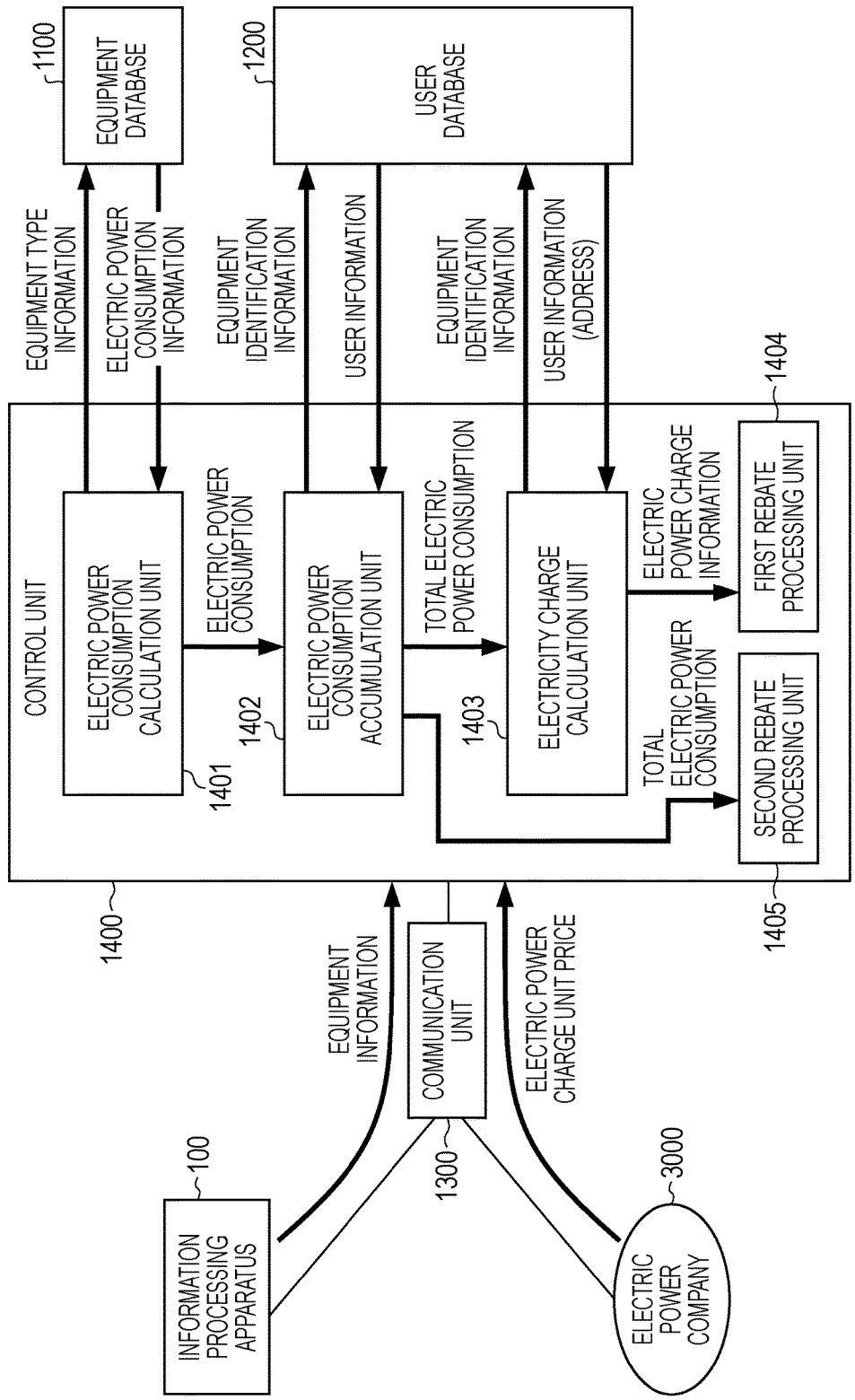
FIG. 6 is an explanatory diagram for describing a processing in the rebate processing server.

With reference to FIG. 6, a processing in the rebate processing server 1000 that has received the equipment information will be described. When the equipment information is transmitted from the information processing apparatus 100, the equipment information is supplied from the communication unit 1300 to the control unit 1400.

First, the electric power consumption calculation unit 1401 refers to the equipment database 1100 on the basis of the equipment type information transmitted from the information processing apparatus 100 to obtain the electric power consumption information indicating the electric power consumption of the equipment 10 used by the user. After that, on the basis of the usage time of the equipment 10 indicated by the equipment usage time information included in the equipment information and the electric power consumption of the equipment 10 indicated by the electric power consumption information, an electric power amount employed for the user to use the equipment 10 (hereinafter, which will be referred to as electric power consumption) is calculated. The electric power consumption is calculated by using Expression 1 described below. The calculated electric power consumption is supplied to the electric power consumption accumulation unit 1402.

Total electric power consumption=Usage time×Electric power consumption        [Expression 1]

The electric power consumption accumulation unit 1402 refers to the user database 1200 on the basis of the equipment identification information transmitted from the information processing apparatus 100 to identify the user that uses the equipment 10. Then, the electric power consumption accumulation unit 1402 accumulates the electric power supplied from the electric power consumption calculation unit 1401 for each user.

With this configuration, the total electric power consumption of the equipment 10 by the user in a predetermined period of time (for example, one month or the line) is calculated. The total electric power consumption in the predetermined period of time obtained through this accumulation may be matched with an interval at which a rebate processing described below is carried out. For example, in a case where the rebate processing is carried out once a month, the electric power consumption for one month are calculated to obtain the total electric power consumption.

In a case where the user uses the plural equipment 10 produced by the manufacturer 6000, instead of accumulating the electric power consumption for each equipment 10 to calculate the total electric power consumption, the electric power consumption for all the equipment are collectively accumulated irrespective of the number of the equipment used by the user. With this configuration, even in a case where the user uses the plural equipment 10 produced by the manufacturer 6000, irrespective of the number of equipment, the total electric power consumption of the user can be obtained. It is however noted that this description does not deny the accumulation of the electric power consumption for each equipment, and it is also possible to accumulate the electric power consumption for each equipment. The calculated total electric power consumption information is supplied to the electricity charge calculation unit 1403 and the second rebate processing unit 1405.

When the total electric power consumption information is received from the electric power consumption accumulation unit 1402, the electricity charge calculation unit 1403 refers to the equipment database 1100 on the basis of the equipment identification information transmitted from the information processing apparatus 100 to obtain an address of the user.

After that, the electricity charge calculation unit 1403 obtains information on an electricity charge unit price assigned by the concerned electric power company 3000 on the basis of the address of the user. The electricity charge unit price for the electric power company 3000 may be obtained, for example, by accessing servers of the respective electric power companies 3000 via the internet as illustrated in FIG. 6. The electricity charge unit price may be stored in the rebate processing server 1000. In a case where the electricity charge unit price is stored in the rebate processing server 1000, the electricity charge is regularly updated.

Then, the electricity charge calculation unit 1403 calculates an electricity charge in accordance with the usage of the equipment 10 by the user while using Expression 2 described below on the basis of the total electric power consumption and the electricity charge unit price for the electric power company 3000. This electricity charge is equivalent of the electricity charge paid by the user to the electric power company 3000 for the usage of the equipment 10. The electricity charge information indicating the calculated electricity charge is supplied to the first rebate processing unit 1404.

Electric power charge=Total electric power consumption×Electricity charge unit price assigned by an electric power company        [Expression 2]

The first rebate processing unit 1404 performs a processing for a benefit rebate on the basis of the electricity charge for the user in a predetermined period of time which is indicated by the electricity charge information.

As a rebate method performed by the first rebate processing unit 1404, a cash back of the electricity charge to the user is exemplified. The cash back of the electricity charge is realized by executing a payment transfer processing in which an amount corresponding to the electricity charge generated when the user uses the equipment 10 of the manufacturer 6000 is transferred to a bank account of the user on the basis of account information of the user. The payment transfer processing can be conducted, for example, by executing software for the payment transfer processing in related art.

If this cash back is conducted for all the electricity charge for the user in the predetermined period of time, the electricity charge on the equipment 10 produced by the manufacturer 6000 is free for the user. If this cash back is conducted for half of the electricity charge for the user in the predetermined period of time, the electricity charge on the equipment 10 produced by the manufacturer 6000 is at half price for the user. A determination on how many percentages of cash back available for the electricity charge may be conducted through a contract or the like between the user and the manufacturer 6000.

The first rebate processing unit 1404 may compare the electricity charge for the user which is indicated by the electricity charge information with a predetermined threshold and perform the payment transfer processing only in a case where the electricity charge is higher than or equal to the threshold. If the cash back is conducted uniformly even in a case where the electricity charge is low, a wasteful loss may occur. For example, cost for the payment transfer processing is higher than the cash back money. The electricity charge that does not become the subject of the cash back because the electricity charge is lower than the threshold may be carried over to another occasion for the payment transfer processing for the next cash back.

The rebate to the user may not be the money. In addition to the money, the rebate may also be conducted by providing points usable for a service provided by the manufacturer 6000, mileage points, a voucher, and the like to the user.

The second rebate processing unit 1405 performs a rebate processing on the basis of the total electric power consumption for the user in a predetermined period of time which is indicated by the total electric power consumption information. As a rebate method performed by the second rebate processing unit 1405, the purchase of the renewable energy certificate is exemplified. The second rebate processing unit 1405 performs an online purchase processing, for example, for a renewable energy certificate corresponding to the total electric power consumption of the user.

It is noted that only one or both of the processings by the first rebate processing unit 1404 and the second rebate processing unit 1405 may be performed.

Now, a scheme of the benefit rebate to the user through the purchase of the renewable energy certificate will be described. As illustrated in FIG. 1, when the manufacturer 6000 purchases the renewable energy certificate in accordance with the total electric power consumption of the user, the renewable energy certificate issuance company 4000 pays a fee calculated by subtracting various expenses and the like from the purchase fee of the renewable energy certificate to the natural energy power generation company 2000.

The natural energy power generation company 2000 sells the electric power obtained through the natural energy power generation to the electric power company 3000. Then, the electric power company 3000 performs the electric power supply to the user by using the electric power purchased from the natural energy power generation company 2000 and the electric power generated by itself. The user uses the equipment 10 of the manufacturer 6000 by employing the relevant electric power.

Therefore, the purchase fee of the renewable energy certificate is paid via the renewable energy certificate issuance company 4000 to the natural energy power generation company 2000, and the natural energy power generation company 2000 can use the received fee to the natural energy power generation costs, research and development, and the like. With this configuration, it is conceivable that the natural energy power generation is promoted, the power generation amount based on the natural energy power generation is increased, and the ratio of the electric power based on the natural energy power generation accounting for the electric power supplied to the user is being increased. With this, it is possible to rebate the benefits of the reduction of the carbon dioxide and the environment preservation to the user.

In the present circumstances, it is considered that the cost for the power generation based on the natural energy is higher than the cost for thermal power generation or the atomic power generation. However, while the manufacturer 6000 performs the purchase of the renewable energy certificate as described above, the user can indirectly provide a fund to the natural energy power generation company 2000 via the manufacturer 6000 and the renewable energy certificate issuance company 4000. With this, the cost reduction of the natural energy power generation is advanced along with the progress in the research and development of the natural energy power generation and the like, and the price reduction of the electric power based on the natural energy power generation is achieved, so that it is conceivable that the benefit of price reduction of the electric power charge can also be provided to the user.

When the purchase processing for the renewable energy certificate is executed, it is desirable to carry out the purchase processing for the renewable energy certificate by summing up the total electric power consumption of all the users registered in the user database 1200. This is because, upon the purchase processing for the renewable energy certificate, the individual users are not distinguished from one another. By summing up the total electric power consumption of all the users and carrying out the purchase processing for the renewable energy certificate corresponding to the summed-up total electric power consumption, the increase in the number of process cases is avoided, and the load on the rebate processing server 1000 can be reduced.

Upon the purchase processing for the renewable energy certificate, the individual users are not distinguished from one another because the above-mentioned benefit rebated through the purchase of the renewable energy certificate is not provided to each individual user but is rebated to all the users owning the equipment of the manufacturer 6000 and the whole society.

The obtainment and transmission of the information on electric power consumed by the user, the purchase processing for the renewable energy certificate, and the like are automatically carried out in the rebate system including the information processing apparatus 100 and the rebate processing server 1000, and therefore the user can naturally receive the above-mentioned benefit.

For the manufacturer 6000, it is possible to advertise that the enterprise has a high environmental consciousness. The electricity charge imposed on the user becomes free or comparatively cheap by the rebate system related to the present technology, it is conceivable that the user purchases a large number of equipment 10 without concern for the electricity charge. Accordingly, the sales of the manufacturer 6000 may also be increased.

In addition, it is possible to grasp the usage time of the equipment 10 by the user, it becomes easier for the manufacturer 6000 to support the user when the equipment 10 has a failure and promote a replacement order for the equipment 10 at the end of its life. It is possible to grasp the usage time of the equipment 10 by the user, and information obtained through an analysis can also be utilized for the development of a new product.

In addition to the electric power consumption, by grasping a usage pattern of the equipment 10 from the usage time of the equipment 10 by the user, the manufacturer can carry out the development of the equipment 10 in which the electric power consumption is further reduced. Furthermore, since the manufacturer 6000 bears the electricity charge that is originally expected to be paid by the user, it is conceivable that the manufacturer 6000 accelerates the development of the equipment with the low electric power consumption. With this configuration, the electric power consumption in the whole society is reduced.

As described above, the purchase of the renewable energy certificate by the manufacturer 6000 is for increasing the supply of the natural energy electric power to the whole society and rebating a bounty attained from the natural energy to the users. Therefore, the manufacturer 6000 itself may be provided with a power generation facility utilizing the natural energy, and the manufacturer 6000 may sell the natural energy electric power to the electric power company 3000. With this, the bounty attained from the natural energy can be also rebated to the whole society and the users.

2. Second Embodiment

Figure 7:
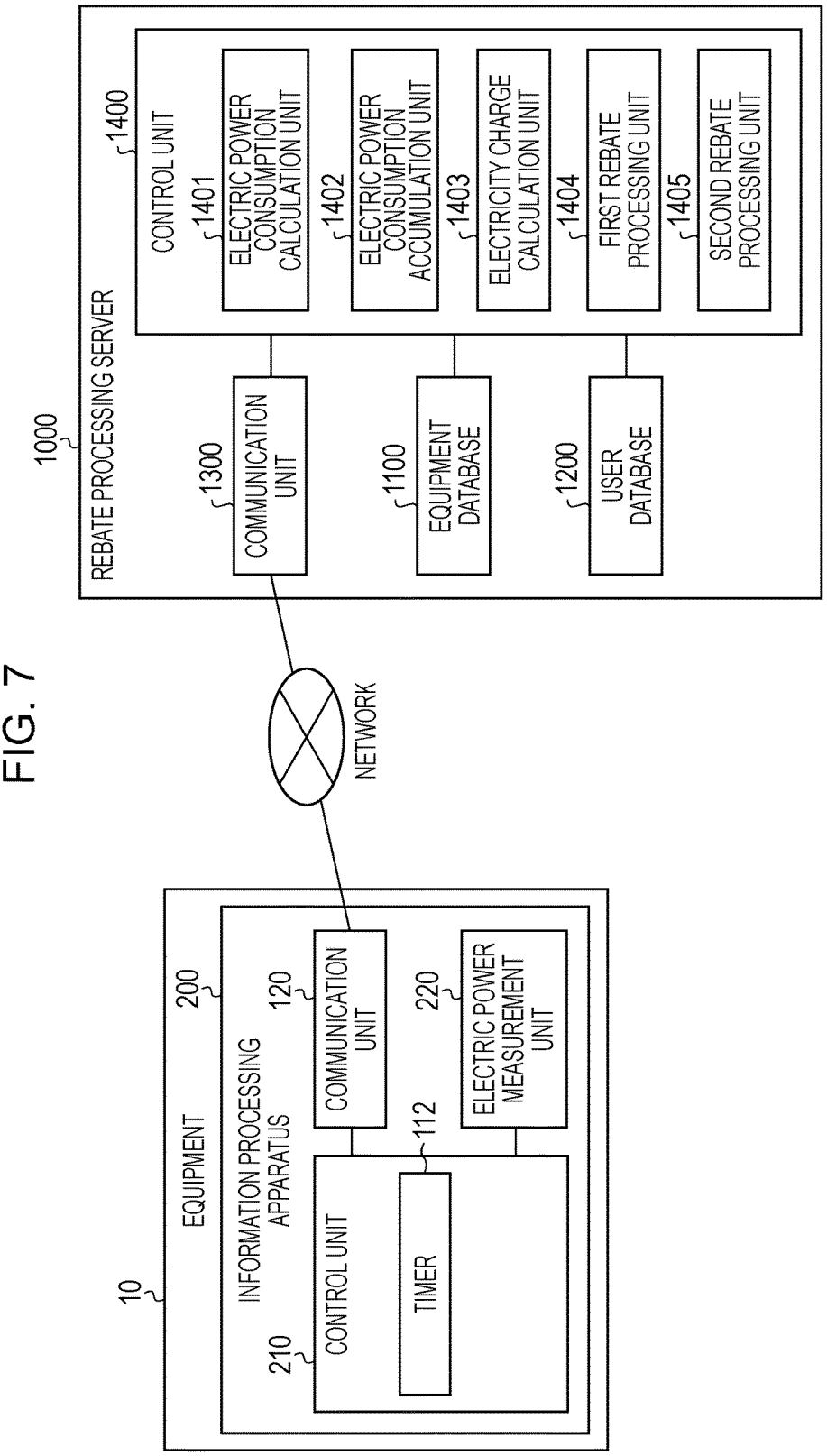
FIG. 7 is a block diagram of configurations of the information processing apparatus and the rebate processing server according to a second embodiment of the present technology.

A second embodiment of the present technology will be described. FIG. 7 is a block diagram of a configuration of an information processing apparatus 200 and the rebate processing server 1000 according to the second embodiment. The second embodiment is different from the first embodiment in that the information processing apparatus 200 is provided with an electric power measurement unit 220 without the provision of the usage time measurement unit 111. The configuration of the information processing apparatus 200 other than the electric power measurement unit 220 is similar to that of the first embodiment, and a description thereof will be omitted.

The electric power measurement unit 220 measures the electric power consumed by the equipment 10 by being provided, for example, with a function as an ammeter and a function as a voltmeter. The measured electric power consumption is transmitted to the rebate processing server 1000 as the electric power related information by the communication unit 120. The electric power consumption measured by the electric power measurement unit 220 is equivalent of electric power related information in the scope of claims. The electric power consumption as the electric power related information is transmitted to the rebate processing server 1000 together with the equipment type information and the equipment identification information similarly as in the first embodiment.

In the rebate processing server 1000 that has received the electric power consumption information transmitted from the information processing apparatus 200, a calculation processing for the electric power consumed by the electric power consumption calculation unit 1401 is not carried out. This is because the information on electric power consumption of the equipment 10 is transmitted from the information processing apparatus 200. Therefore, it suffices that the rebate processing server 1000 carries out the accumulation processing for the electric power consumption by the electric power consumption accumulation unit 1402, the electricity charge calculation processing by the electricity charge 1403, and the rebate processing by the first rebate processing unit 1404 and the second rebate processing unit 1405. The processing in the rebate processing server 1000 is similar to that of the first embodiment, and a description thereof will be omitted.

3. Third Embodiment

Figure 8:
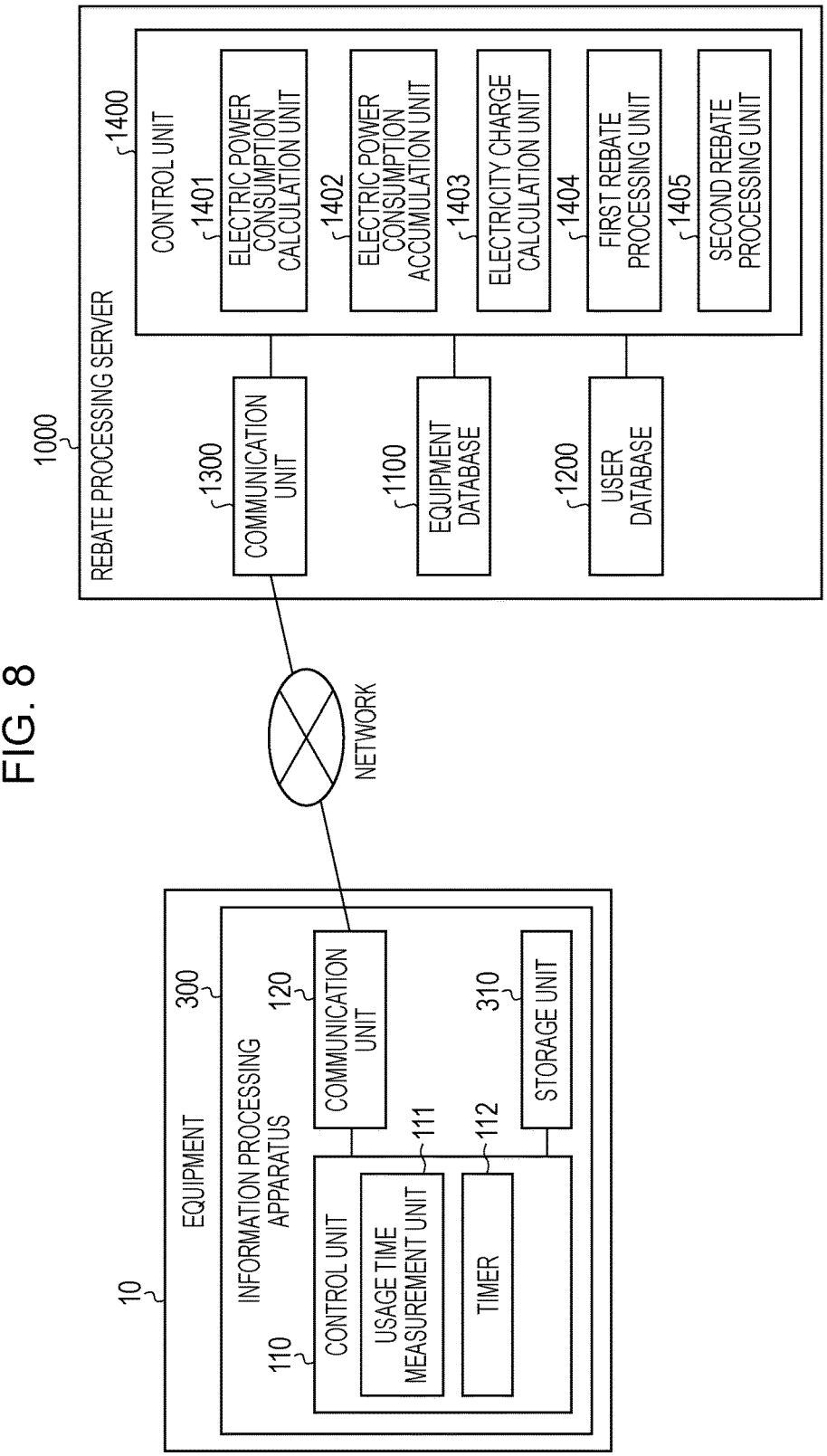
FIG. 8 is a block diagram of configurations of the information processing apparatus and the rebate processing server according to a third embodiment of the present technology.

A third embodiment of the present technology will be described. FIG. 8 is a block diagram of a configuration of an information processing apparatus 300 according to the third embodiment. The third embodiment is different from the first embodiment in that the information processing apparatus 300 is provided with a storage unit 310. A configuration of the information processing apparatus 300 other than the storage unit 310 is similar to that of the first embodiment, and a description thereof will be omitted. The configuration and the processing of the rebate processing server 1000 are similar to those of the first embodiment, and a description thereof will be omitted.

The storage unit 310 is a storage medium that stores and holds the equipment usage time information. Any storage medium may be used for the storage medium constituting the storage unit 310 so long as the storage medium can store the information. For the storage medium, for example, a non-volatile memory, an hard disc drive (HDD), an solid state drive (SSD), and the like are exemplified.

Figure 9:
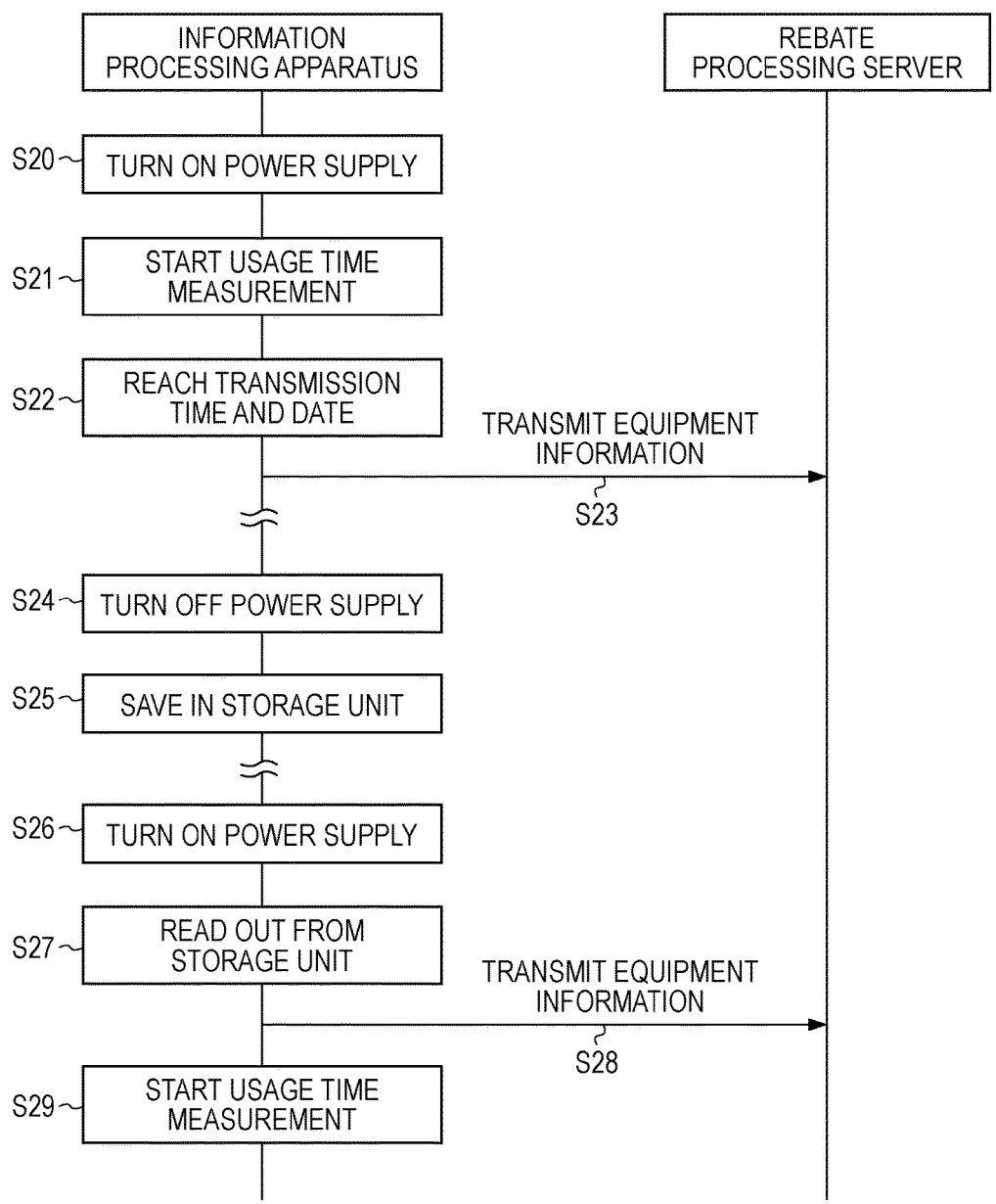
FIG. 9 is a sequence diagram illustrating a flow of the transmission processing for the information from the information processing apparatus to the rebate processing server according to the third embodiment of the present technology.

FIG. 9 is a sequence diagram illustrating a flow of the transmission processing for the equipment identification performed by the information processing apparatus 300 according to the third embodiment. First, in step S20, the power supply of the equipment 10 to which the information processing apparatus 300 is mounted or connected is turned on. After the power supply is turned on, in step S21, the usage time measurement unit 111 detects that the equipment 10 is turned on and starts the measurement for the usage time of the equipment 10.

Then, for example, the usage of the equipment 10 by the user is continued without turning off the power supply of the equipment 10. As illustrated in step S22, when the timer 112 determines that the current time and date reach the transmission time and date for the equipment information, in step S23, under the control of the control unit 110, the communication unit 120 transmits the equipment information to the rebate processing server 1000. The processings in step S21 to step S23 are repeatedly carried out until the power supply of the equipment 10 is turned off.

After that, when the power supply of the equipment 10 is turned off in step S24, the equipment usage time information is saved in the storage unit 310 in step S25. The save of the equipment usage time information in step S25 is carried out at a time when the power supply of the equipment 10 is turned off even if a predetermined period of time does not elapse.

When the power supply of the equipment 10 is turned on in step S26, the control unit 110 reads out the equipment usage time information from the storage unit 310 in step S27 and transmits the equipment information including the read equipment usage time information to the rebate processing server 1000 via the communication unit 120 in step S28. Since the power supply of the equipment 10 is turned on, in step S29, the usage time measurement unit 111 starts the measurement of the usage time.

In the sequence diagram of FIG. 9, the following order is described in which the read and the transmission of the equipment usage time information are carried out in first in step S27 and step S28, and thereafter, in step S29, the usage time measurement is started. However, the order is not limited to the above-mentioned order. The usage time measurement may be started in first, or the usage time measurement may be started at the same time in parallel with the read from the storage unit 310 and the transmission in a multi-tasking operation.

It is conceivable that this mode of the transmission of the electric power related information according to the second embodiment is used, for example, in the equipment 10 such as a television receiver or a personal computer where the equipment is regularly connected to the network while the power supply is on and also when the equipment is not used, the power supply is off.

4. Fourth Embodiment

Figure 10:
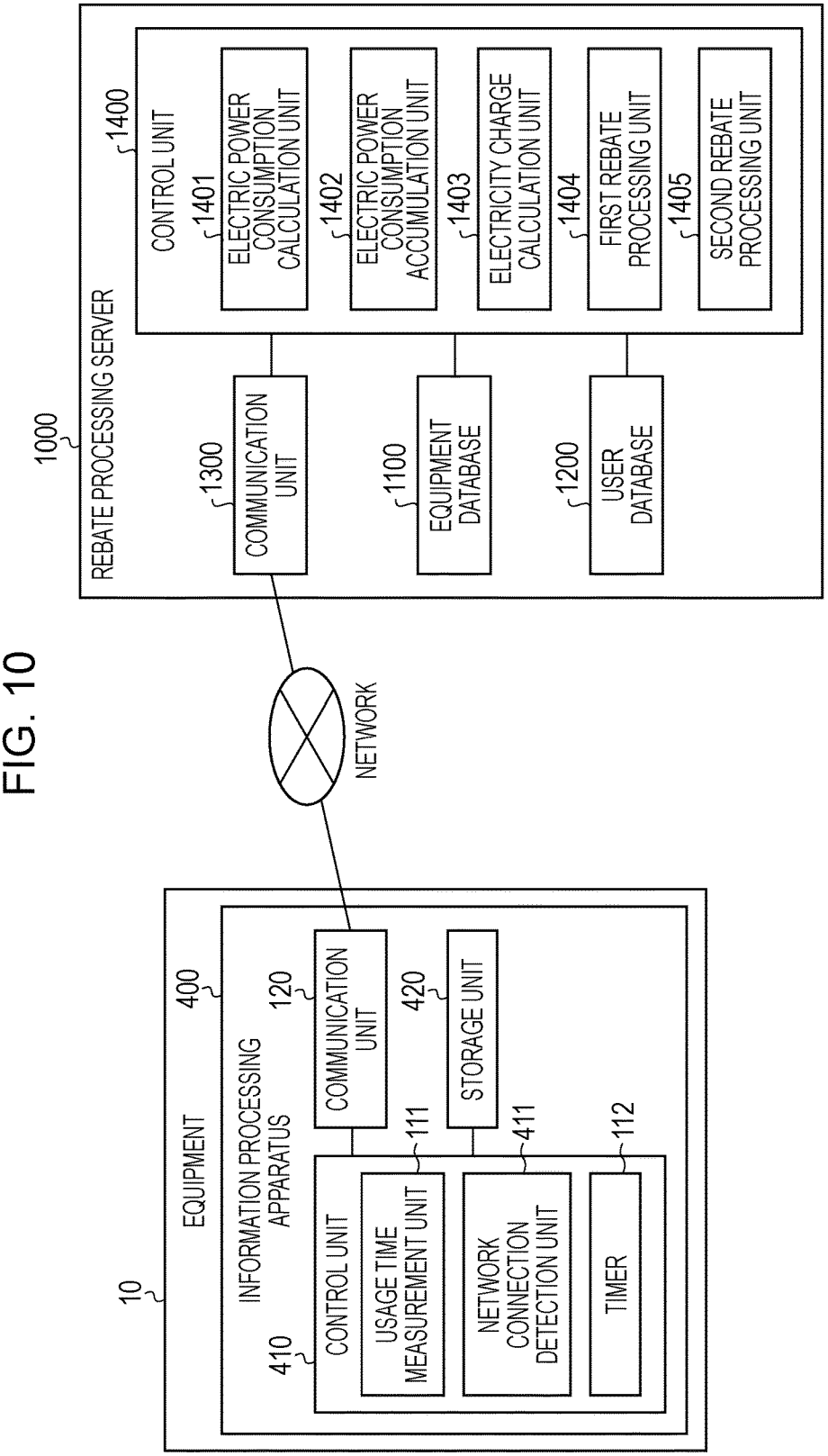
FIG. 10 is a block diagram of configurations of the information processing apparatus and the rebate processing server according to a fourth embodiment of the present technology.

A fourth embodiment of the present technology will be described. FIG. 10 is a block diagram of a configuration of an information processing apparatus 400 according to the fourth embodiment. The fourth embodiment is different from the first embodiment in that the information processing apparatus 400 is provided with a storage unit 420 and the control unit 410 functions as a network connection detection unit 411. A configuration of the information processing apparatus 400 other than the storage unit 420 and the network connection detection unit 411 is similar to that of the first embodiment, and a description thereof will be omitted. The configuration and the processing of the rebate processing server 1000 are similar to those of the first embodiment, and a description thereof will be omitted.

The network connection detection unit 411 detects whether or not the information processing apparatus 400 is connected to the network and notifies the control unit 410 of the result. As a technique for detecting the network connection, for example, a method of transmitting a connection checking packet in regular intervals via the communication unit 120 to the rebate processing server 1000 and determining whether or not a response packet is transmitted from the rebate processing server 1000 is exemplified.

The storage unit 420 is similar to that of the second embodiment and configured to store and save the equipment usage time information.

Figure 11:
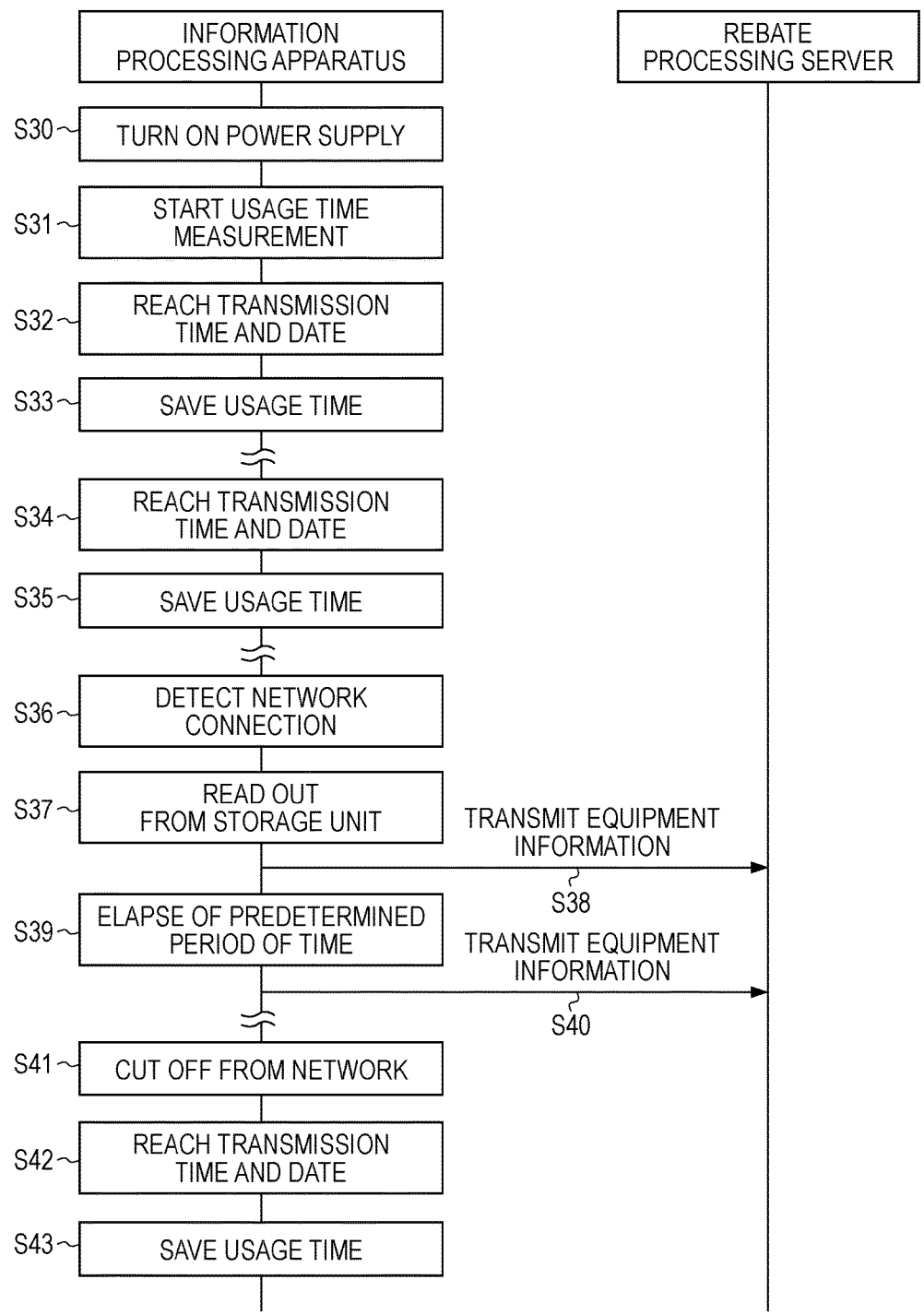
FIG. 11 is a sequence diagram illustrating a flow of the transmission processing for the information from the information processing apparatus to the rebate processing server according to the fourth embodiment of the present technology.

FIG. 11 is a sequence diagram illustrating a mode of the transmission of the equipment identification according to the fourth embodiment. First, in step S30, the power supply of the equipment 10 to which the information processing apparatus 400 is mounted or connected is turned on. In the description, it is configured that the equipment 10 and the information processing apparatus 400 are not connected to the network at this time. In step S31, the usage time measurement unit 111 starts the measurement of the usage time of the equipment 10. When the timer 112 determines that the current time and date reach the point at which the transmission of the equipment identification is carried out in step S32, the equipment usage time information is saved in the storage unit 310 in step S33. This means that the time and date reach the point at which the transmission of the equipment identification is carried out, but the equipment information is not transmitted since the information processing apparatus 400 is not connected to the network, and the equipment usage time information is saved in the storage unit 420.

After that, as illustrated in step S34 and step S35, while the information processing apparatus 400 is not connected to the network, when the timer 112 determines that the time and date reach the point at which the transmission of the equipment identification is carried out, the equipment information is saved in the storage unit 420.

Then, in a case where the network connection detection unit 411 detects that the information processing apparatus 400 is connected to the network in step S36, the control unit 410 reads out the equipment usage time information saved in the storage unit 420 so far in step S37, and transmits the equipment usage time information and further the equipment type information and the equipment identification information to the rebate processing server 1000 in step S38.

Subsequently, while the equipment 10 is connected to the network, in a case where the current time and date reach the point at which the equipment identification is transmitted in step S39, the information processing apparatus 400 transmits the equipment information to the rebate processing server 1000 in step S40.

Then, after the equipment 10 is cut off from the network as illustrated in step S41, when the time and date reach the point at which the transmission of the equipment identification is carried out in step S42, and the equipment usage time information is saved in the storage unit 420 in step S43. When the equipment 10 is connected to the network in the next time, the equipment usage time information saved in step S43 is transmitted to the rebate processing server 1000 together with the equipment type information and the equipment identification information.

It is conceivable that this mode of the transmission of the equipment identification according to the fourth embodiment is used for the equipment that has a function of establishing a connection to the network but is not regularly connected to the network and is connected to the network by the user as circumstances demand. The above-mentioned equipment includes, for example, a digital still camera, a digital video camera, and a portable music player.

5. Modified Examples

In the above, the embodiments according to the present technology have been specifically described, but the present technology is not limited to the above-mentioned embodiments, and various modifications based on the technical idea of the present technology can be proposed.

In some of the equipment 10, the electric power consumption largely varies depending on the operation mode.

For example, the modes include a normal operation mode and a so-called standby mode. In the standby mode, a majority of the functions of the equipment are in a halt condition. The electric power is consumed, but the electric power consumption is decreased to a large extent as compared with the normal operation mode. In view of the above, each time when the operation mode of the equipment is switched, the equipment information including the equipment usage time information may be transmitted from the information processing apparatus to the rebate processing server. As described above, since the equipment database of the rebate processing server also includes the standby energy of the equipment as the electric power consumption information, by carrying out the transmission of the equipment identification for each operation mode, the electric power consumed by the user can be more accurately calculated on the basis of the usage time information at the time of the standby mode and the standby energy.

The above-mentioned first to fourth embodiments may be used in combination instead of being separately executed all the time. For example, as in the second embodiment, the electric power consumption may be calculated by the information processing apparatus, and the electric power consumption information may be once stored in the storage unit and then transmitted to the rebate processing server as in the third embodiment or the fourth embodiment.

As described above, while the manufacturer 6000 purchases the renewable energy certificate, the supply amount of the natural energy electric power to the whole society is increased, and the bounty attained from the natural energy electric power can be rebated to the user. That is, so long as the natural energy electric power can be supplied to the user, the method is not limited to the purchase of the renewable energy certificate.

Figure 12:
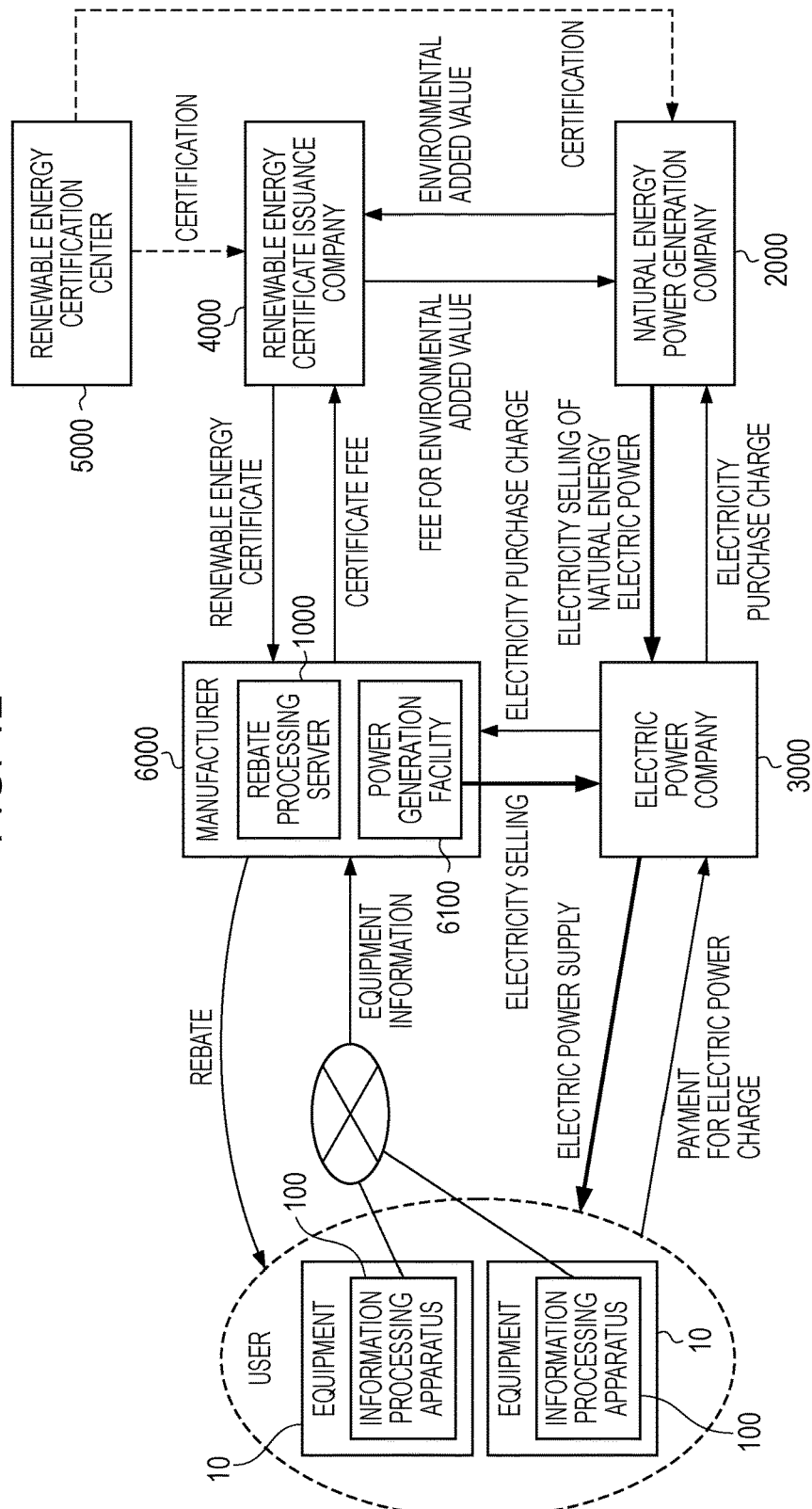
FIG. 12 illustrates an entire configuration of the rebate system according to a modified example of the present technology.

As illustrated in FIG. 12, the manufacturer 6000 may include a power generation facility 6100, and instead of the above-mentioned purchase of the renewable energy certificate or together with the purchase of the renewable energy certificate, the manufacturer 6000 may perform the electric power supply. The power generation facility 6100 is a power generation facility using so-called the natural energy (renewable energy) such as solar photovoltaic power, solar thermal power, wind power, hydraulic power, small hydraulic power, tidal power, wave power, gradient power, marine currents power, biomass power, and geothermal heat power. However, the power generation method using the natural energy is not limited to the above-mentioned method, and any method may be adopted so long as the power generation method has the low environment load including a power generation method expected to be newly developed in the days to come.

In this case, as illustrated in FIG. 13, the control unit 1400 provided to the rebate processing server 1000 further functions as a power generation amount determination unit 1406. The power generation amount determination unit 1406 determines a power generation amount in the power generation facility 6100 on the basis of the total electric power consumption in a predetermined period of time (a month or the like) which is calculated by the electric power consumption accumulation unit 1402. Then, the determined power generation amount information is transmitted to the power generation facility 6100 via the network, a dedicated-use line, or the like.

When the power generation amount is determined, it is desirable to sum up the total electric power consumption of all the users registered in the user database 1200 to determine the power generation amount. This is because upon the determination processing for the power generation amount, the individual users are not distinguished from one another.

The determination on the power generation amount may be carried out on the basis of a predetermined algorithm. For example, an electric power amount equal to the total amount of the total electric power consumption of all the users is set as an electric power amount by the power generation facility 6100. In addition, the predetermined ratio of the total amount of the total electric power consumption of all the users may be set as the electric power amount.

Under a predetermined control, the power generation facility 6100 performs the power generation for the electric power amount determined by the power generation amount determination unit 1406. After that, the generated electric power thus obtained is used for the electric power selling to the electric power company 3000 as illustrated in FIG. 12.

The manufacturer 6000 that has performed the electric power selling to the electric power company 3000 receives the charge in accordance with the electric power selling amount from the electric power company 3000. With this configuration too, the supply amount of the natural energy electric power in the whole society is increased, and the bounty attained from the natural energy can be rebated to the user.

The present technology can adopt the following configurations.

(1) An information processing apparatus including:
an electric power related information obtaining unit mounted on connected to equipment and configured to obtain electric power related information with regard to the equipment; and
a communication unit configured to transmit the electric power related information obtained by the electric power related information obtaining unit to a rebate processing apparatus connected via a network.

(2) The information processing apparatus according to (1), in which
the electric power related information indicates a period of time during which the equipment is in operation, and
the electric power related information obtaining unit measures the period of time during which the equipment is in operation.

(3) The information processing apparatus according to (1) or (2), in which via the transmission unit, equipment type information indicating a type of the equipment is further transmitted.

(4) The information processing apparatus according to any one of (1) to (3), in which via the transmission unit, equipment identification information for identifying the equipment is further transmitted.

(5) The information processing apparatus according to any one of (1) to (4), further including:
a storage unit configured to store the electric power related information, in which
the storage unit stores the electric power related information obtained by the electric power related information obtaining unit at a time when a power supply of the equipment is turned off, and
the communication unit transmits the electric power related information stored in the storage unit to the rebate processing apparatus at a time when the power supply of the equipment is turned on.

(6) The information processing apparatus according to any one of (1) to (5), further including:
a storage unit configured to store the electric power related information, in which
the storage unit stores the electric power related information in a case where the communication unit is not connected to the network, and
the communication unit transmits the electric power related information stored in the storage unit to the rebate processing apparatus at a time when the communication unit is connected to the network.

(7) The information processing apparatus according to any one of (3) to (6), in which
the electric power related information indicates electric power consumed by the equipment, and
the electric power related information obtaining unit measures the electric power consumption.

(8) The information processing apparatus according to any one of (1) to (7), in which the electric power related information further indicates a period of time during which the equipment is in a standby state, and the electric power related information obtaining unit measures the period of time during which the equipment is in operation and also measures the period of time during which the equipment is in the standby state.

(9) A rebate processing apparatus including:

a communication unit configured to receive electric power related information transmitted from an information processing apparatus mounted on or connected to equipment via the network;

a rebate reference calculation unit configured to calculate a rebate reference functioning as a reference for a rebate processing on the basis of the electric power related information; and a rebate processing unit configured to perform a predetermined rebate processing on the basis of the rebate reference.

(10) The rebate processing apparatus according to (9), in which the electric power related information indicates a period of time during which the equipment is in operation, the rebate reference calculation unit calculates electric power consumed by the equipment as the rebate reference on the basis of the electric power related information and electric power consumption information of the equipment, and the rebate processing unit performs the predetermined rebate processing on the basis of the electric power consumed by the equipment.

(11) The rebate processing apparatus according to (9) or (10), in which the communication unit receives equipment type information indicating a type of the equipment from the information processing apparatus, and the rebate reference calculation unit the rebate reference calculation unit refers to equipment database storing electric power consumption information for each equipment on the basis of the equipment type information and obtains the electric power information of the equipment and calculates the electric power consumed by the equipment on the basis of the electric power related information and the electric power information of the equipment.

(12) The rebate processing apparatus according to any one of (9) to (11), in which the rebate reference calculation unit accumulates the electric power consumption for each user of the equipment and calculates an accumulative electric power consumption as the rebate reference, and the rebate processing unit performs the predetermined rebate processing for each user on the basis of the accumulative electric power consumption.

(13) The rebate processing apparatus according to any one of (9) to (12), in which the communication unit receives equipment identification information for identifying the equipment transmitted from the information processing apparatus, and the rebate reference calculation unit refers to user database storing user information of the equipment on the basis of the equipment identification information to identify the user and accumulates the electric power consumption for each user to calculate the accumulative electric power consumption.

(14) The rebate processing apparatus according to any one of (9) to (13), in which the rebate reference calculation unit calculates an electric power charge resulted from a usage of the equipment as the rebate reference on the basis of the electric power consumed by the equipment and an electric power charge unit price.

(15) The rebate processing apparatus according to any one of (9) to (14), in which the rebate processing unit performs a payment transfer processing on the basis of the rebate reference for each user.

(16) The rebate processing apparatus according to any one of (9) to (14), in which the rebate processing unit performs a purchase processing for a renewable energy certificate on the basis of the rebate reference.

(17) The rebate processing apparatus according to any one of (9) to (14), further including:

an electric power generation amount determination unit configured to determine an electric power generation amount by an electric power generation facility on the basis of the rebate reference, in which the electric power generation amount determined by the electric power generation amount determination unit is supplied to the electric power generation facility.

(18) An information processing method including:

obtaining electric power related information related to equipment; and transmitting the electric power related information to a rebate processing apparatus connected via a network.

(19) A rebate processing method including:

receiving electric power related information transmitted from an information processing apparatus mounted on or connected to equipment via a network;

calculating a rebate reference functioning as a reference for a rebate processing on the basis of the electric power related information; and performing a predetermined rebate processing on the basis of the rebate reference.

(20) A rebate system including:

an information processing apparatus including an electric power related information obtaining unit mounted on or connected to equipment and configured to obtain electric power related information with regard to the equipment, and a first communication unit configured to transmit the electric power related information obtained by the electric power related information obtaining unit to a rebate processing apparatus connected via a network; and a rebate processing apparatus including a second communication unit configured to receive the electric power related information transmitted from the information processing apparatus, a rebate reference calculation unit configured to calculate a rebate reference functioning as a reference for a rebate processing on the basis of the electric power related information, and a rebate processing unit configured to perform a predetermined rebate processing on the basis of the rebate reference.

The present disclosure contains subject matter related to that disclosed in Japanese Priority Patent Application JP 2011-156247 filed in the Japan Patent Office on Jul. 15, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a central processing unit (CPU) configured to:
- detect an ON state associated with an equipment connected to the information processing apparatus;
- determine electric power consumption information based on the ON state associated with the equipment;
- determine a mode of operation corresponding to the equipment, wherein
  - the mode of operation indicates one of a standby mode of operation or a normal mode of operation of the equipment;
- transmit equipment usage time information corresponding to the electric power consumption information and equipment identification information indicating an identity associated with the equipment to a rebate processing server based on the mode of operation that has switched from the standby mode of operation to the normal mode of operation of the equipment; and
- transmit the equipment usage time information and the equipment identification information to the rebate processing server based on the mode of operation that has switched from the normal mode of operation to the standby mode of operation of the equipment, wherein the electric power consumption information is accurately calculated based on the equipment usage time information corresponding to a time of the standby mode of operation and standby energy associated with the equipment.

2. The information processing apparatus according to claim 1, wherein
the electric power consumption information indicates a first period of time of operation associated with the equipment; and
the CPU is further configured to measure the first period of time of operation associated with the equipment based on the ON state.

3. The information processing apparatus according to claim 2, wherein the CPU is further configured to:
detect an OFF state associated with the equipment; and
transmit the equipment usage time information to the rebate processing server based on the first period of time and the OFF state.

4. The information processing apparatus according to claim 1, wherein
the electric power consumption information indicates electric power consumed by the equipment; and
the CPU is further configured to measure the electric power consumed by the equipment.

5. The information processing apparatus according to claim 1, wherein the CPU is further configured to determine the electric power consumption information corresponding to one of the standby mode of operation or the normal mode of operation.

6. A method, comprising:
detecting, by an information processing apparatus, an ON state associated with an equipment connected to the information processing apparatus;
determining, by the information processing apparatus, electric power consumption information based on the ON state associated with the equipment;
determining, by the information processing apparatus, a mode of operation corresponding to the equipment, wherein
the mode of operation indicates one of a standby mode of operation or a normal mode of operation of the equipment;
transmitting, by the information processing apparatus, equipment usage time information corresponding to the electric power consumption information and equipment identification information indicating an identity associated with the equipment to a rebate processing server based on the mode of operation that has switched from the standby mode of operation to the normal mode of operation of the equipment; and
transmitting, by the information processing apparatus, the equipment usage time information and the equipment identification information to the rebate processing server based on the mode of operation that has switched from the normal mode of operation to the standby mode of operation of the equipment,
wherein the electric power consumption information is accurately calculated based on the equipment usage time information corresponding to a time of the standby mode of operation and standby energy associated with the equipment.

7. The information processing apparatus according to claim 1,
wherein the rebate processing server executes a rebate calculation process that outputs benefit information corresponding to the electric power consumption information,
wherein the benefit information includes a rebate credited to a bank account of a user, and
wherein the rebate is credited based on an electricity charge paid by the user for usage of the equipment in a first period of time.

8. The information processing apparatus according to claim 2, further comprising:
a timer configured to determine the first period of time that is associated with a threshold time and date of the transmission of the equipment usage time information and the equipment identification information,
wherein the CPU is further configured to transmit the equipment usage time information and the equipment identification information to the rebate processing server, based on the threshold time and the date.

* * * * *